US011444974B1

(12) United States Patent
Shakhzadyan et al.

(10) Patent No.: US 11,444,974 B1
(45) Date of Patent: Sep. 13, 2022

(54) SYSTEMS AND METHODS FOR CYBER-PHYSICAL THREAT MODELING

(71) Applicant: ARCHITECTURE TECHNOLOGY CORPORATION, Eden Prairie, MN (US)

(72) Inventors: Martiros Shakhzadyan, Ithaca, NY (US); Judson Powers, Ithaca, NY (US); Matthew A. Stillerman, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 340 days.

(21) Appl. No.: 16/661,513

(22) Filed: Oct. 23, 2019

(51) Int. Cl.
*H04L 9/40* (2022.01)

(52) U.S. Cl.
CPC ...... *H04L 63/1466* (2013.01); *H04L 63/1416* (2013.01); *H04L 63/1425* (2013.01); *H04L 63/1433* (2013.01)

(58) Field of Classification Search
CPC ............. H04L 63/1466; H04L 63/1416; H04L 63/1425; H04L 63/1433
USPC ........................................................ 726/23
See application file for complete search history.

(56) References Cited

U.S. PATENT DOCUMENTS

| | | | |
|---|---|---|---|
| 4,895,518 A | 1/1990 | Arnold et al. | |
| 5,115,433 A | 5/1992 | Baran et al. | |
| 5,440,723 A | 8/1995 | Arnold et al. | |
| 5,601,432 A | 2/1997 | Bergman | |
| 5,944,783 A | 8/1999 | Nieten | |
| 5,974,549 A | 10/1999 | Golan | |

(Continued)

FOREIGN PATENT DOCUMENTS

| | | |
|---|---|---|
| CN | 106709613 A | 5/2017 |
| WO | WO-02/071192 A2 | 9/2002 |
| WO | WO-2017/105383 A1 | 6/2017 |

OTHER PUBLICATIONS

Xu B, Zhong Z, He G. A minimum defense cost calculation method for cyber physical system. In 2019 Seventh International Conference on Advanced Cloud and Big Data (CBD) Sep. 21, 2019 (pp. 192-197). IEEE. (Year: 2019).*

(Continued)

*Primary Examiner* — Brian F Shaw
(74) *Attorney, Agent, or Firm* — Foley & Lardner LLP

(57) ABSTRACT

Systems, methods, and products comprise an analytic server, which improves security of a unified system of distributed network infrastructure comprising a plurality of cyber-physical systems. The analytic server may instantiate a sub attack tree for each cyber-physical system within the unified system. The analytic server may determine how the interconnection of the plurality of cyber-physical systems may affect the unified system security. The analytic server may monitor systems and receive electronic notifications of alerts in real-time from devices in the plurality of cyber-physical systems. The analytic server may follow the logic of the attack tree model by traversing the attack tree from bottom up and determine how the alerts from the cyber-physical systems may affect the distributed network infrastructure as a whole. The analytic server may generate reports comprising a list of the prioritized attacks and recommendation actions to mitigate the attacks.

20 Claims, 6 Drawing Sheets

(56) References Cited

U.S. PATENT DOCUMENTS

| | | |
|---|---|---|
| 5,974,579 A | 10/1999 | Lepejian et al. |
| 6,088,804 A | 7/2000 | Hill et al. |
| 6,345,283 B1 | 2/2002 | Anderson |
| 6,658,481 B1 | 12/2003 | Basso et al. |
| 6,985,476 B1 | 1/2006 | Elliott et al. |
| 7,058,968 B2 | 6/2006 | Rowland et al. |
| 7,107,347 B1 | 9/2006 | Cohen |
| 7,228,566 B2 | 6/2007 | Caceres et al. |
| 7,234,168 B2 | 6/2007 | Gupta et al. |
| 7,317,733 B1 | 1/2008 | Olsson et al. |
| 7,325,252 B2 | 1/2008 | Bunker et al. |
| 7,372,809 B2 | 5/2008 | Chen et al. |
| 7,522,908 B2 | 4/2009 | Hrastar |
| 7,694,328 B2 | 4/2010 | Joshi et al. |
| 7,743,074 B1 * | 6/2010 | Parupudi et al. ....... H04W 4/18 |
| 7,748,040 B2 | 6/2010 | Adelstein et al. |
| 7,886,049 B2 | 2/2011 | Adelstein et al. |
| 7,925,984 B2 | 4/2011 | Awe et al. |
| 7,930,353 B2 | 4/2011 | Chickering et al. |
| 7,962,961 B1 | 6/2011 | Griffin et al. |
| 8,079,080 B2 | 12/2011 | Borders |
| 8,156,483 B2 | 4/2012 | Berg et al. |
| 8,176,557 B2 | 5/2012 | Adelstein et al. |
| 8,250,654 B1 | 8/2012 | Kennedy et al. |
| 8,266,320 B1 | 9/2012 | Bell et al. |
| 8,296,848 B1 | 10/2012 | Griffin et al. |
| 8,307,444 B1 | 11/2012 | Mayer et al. |
| 8,321,437 B2 | 11/2012 | Lim |
| 8,341,732 B2 | 12/2012 | Croft et al. |
| 8,407,801 B2 | 3/2013 | Ikegami et al. |
| 8,433,768 B1 | 4/2013 | Bush et al. |
| 8,490,193 B2 | 7/2013 | Sarraute Yamada et al. |
| 8,495,229 B2 | 7/2013 | Kim |
| 8,499,354 B1 | 7/2013 | Satish et al. |
| 8,554,536 B2 | 10/2013 | Adelman et al. |
| 8,893,278 B1 | 11/2014 | Chechik |
| 9,083,741 B2 | 7/2015 | Powers |
| 9,137,325 B2 | 9/2015 | Muhunthan et al. |
| 9,208,323 B1 | 12/2015 | Karta et al. |
| 9,325,728 B1 | 4/2016 | Kennedy et al. |
| 9,626,414 B2 | 4/2017 | Kanjirathinkal et al. |
| 9,882,912 B2 | 1/2018 | Joo |
| 10,079,850 B1 | 9/2018 | Patil et al. |
| 10,083,624 B2 | 9/2018 | Brueckner et al. |
| 10,291,634 B2 | 5/2019 | Arzi et al. |
| 10,291,638 B1 | 5/2019 | Chandana et al. |
| 10,686,811 B1 | 6/2020 | Ehle |
| 10,749,890 B1 | 8/2020 | Aloisio et al. |
| 10,803,766 B1 | 10/2020 | Donovan et al. |
| 10,868,825 B1 | 12/2020 | Dominessy et al. |
| 10,949,338 B1 | 3/2021 | Sirianni et al. |
| 2002/0073204 A1 | 6/2002 | Dutta et al. |
| 2002/0078382 A1 | 6/2002 | Sheikh et al. |
| 2002/0129264 A1 | 9/2002 | Rowland et al. |
| 2002/0162017 A1 | 10/2002 | Sorkin et al. |
| 2003/0056116 A1 | 3/2003 | Bunker et al. |
| 2003/0182582 A1 | 9/2003 | Park et al. |
| 2003/0236993 A1 | 12/2003 | McCreight et al. |
| 2004/0039921 A1 | 2/2004 | Chuang |
| 2005/0132225 A1 | 6/2005 | Gearhart |
| 2005/0138413 A1 | 6/2005 | Lippmann et al. |
| 2005/0165834 A1 | 7/2005 | Nadeau et al. |
| 2005/0193173 A1 | 9/2005 | Ring et al. |
| 2005/0193430 A1 | 9/2005 | Cohen et al. |
| 2005/0203921 A1 | 9/2005 | Newman et al. |
| 2006/0037076 A1 | 2/2006 | Roy |
| 2006/0104288 A1 | 5/2006 | Yim et al. |
| 2006/0109793 A1 | 5/2006 | Kim et al. |
| 2006/0167855 A1 | 7/2006 | Ishikawa et al. |
| 2006/0191010 A1 | 8/2006 | Benjamin |
| 2006/0248525 A1 | 11/2006 | Hopkins |
| 2006/0253906 A1 | 11/2006 | Rubin et al. |
| 2006/0271345 A1 | 11/2006 | Kasuya |
| 2007/0055766 A1 | 3/2007 | Petropoulakis et al. |
| 2007/0112714 A1 | 5/2007 | Fairweather |
| 2007/0192863 A1 | 8/2007 | Kapoor et al. |
| 2008/0010225 A1 | 1/2008 | Gonsalves et al. |
| 2008/0167920 A1 | 7/2008 | Schmidt et al. |
| 2008/0183520 A1 | 7/2008 | Cutts et al. |
| 2008/0222734 A1 | 9/2008 | Redlich et al. |
| 2009/0007270 A1 | 1/2009 | Futoransky et al. |
| 2009/0144827 A1 | 6/2009 | Peinado et al. |
| 2009/0150998 A1 | 6/2009 | Adelstein et al. |
| 2009/0158430 A1 | 6/2009 | Borders |
| 2009/0164522 A1 | 6/2009 | Fahey |
| 2009/0208910 A1 | 8/2009 | Brueckner et al. |
| 2009/0254572 A1 | 10/2009 | Redlich et al. |
| 2009/0288164 A1 | 11/2009 | Adelstein et al. |
| 2009/0319247 A1 | 12/2009 | Ratcliffe et al. |
| 2009/0319249 A1 | 12/2009 | White et al. |
| 2009/0319647 A1 | 12/2009 | White et al. |
| 2009/0319906 A1 | 12/2009 | White et al. |
| 2009/0320137 A1 | 12/2009 | White et al. |
| 2009/0328033 A1 | 12/2009 | Kohavi et al. |
| 2010/0010968 A1 | 1/2010 | Redlich et al. |
| 2010/0058114 A1 | 3/2010 | Perkins et al. |
| 2010/0082513 A1 | 4/2010 | Liu |
| 2010/0146615 A1 | 6/2010 | Locasto et al. |
| 2010/0284282 A1 | 11/2010 | Golic |
| 2010/0319069 A1 | 12/2010 | Granstedt et al. |
| 2011/0154471 A1 | 6/2011 | Anderson et al. |
| 2011/0177480 A1 | 7/2011 | Menon et al. |
| 2011/0282715 A1 | 11/2011 | Nguyen et al. |
| 2012/0210017 A1 | 8/2012 | Muhunthan et al. |
| 2012/0210427 A1 | 8/2012 | Bronner et al. |
| 2013/0014264 A1 | 1/2013 | Kennedy et al. |
| 2013/0019312 A1 | 1/2013 | Bell et al. |
| 2013/0055404 A1 * | 2/2013 | Khalili ............... H04L 63/1416 |
| 2013/0347085 A1 | 12/2013 | Hawthorn et al. |
| 2013/0347116 A1 | 12/2013 | Flores et al. |
| 2014/0046645 A1 | 2/2014 | White et al. |
| 2014/0099622 A1 | 4/2014 | Arnold et al. |
| 2014/0287383 A1 | 9/2014 | Willingham et al. |
| 2014/0321735 A1 | 10/2014 | Zhang et al. |
| 2014/0337971 A1 | 11/2014 | Casassa Mont et al. |
| 2015/0050623 A1 | 2/2015 | Falash et al. |
| 2015/0106324 A1 | 4/2015 | Puri et al. |
| 2015/0193695 A1 | 7/2015 | Cruz Mota et al. |
| 2015/0213260 A1 | 7/2015 | Park |
| 2015/0213730 A1 | 7/2015 | Brueckner et al. |
| 2015/0339477 A1 | 11/2015 | Abrams et al. |
| 2016/0028764 A1 | 1/2016 | Vasseur et al. |
| 2016/0099953 A1 | 4/2016 | Hebert et al. |
| 2016/0173495 A1 | 6/2016 | Joo |
| 2016/0188814 A1 | 6/2016 | Raghavan et al. |
| 2016/0219024 A1 | 7/2016 | Verzun et al. |
| 2016/0234242 A1 | 8/2016 | Knapp et al. |
| 2016/0246662 A1 | 8/2016 | Meng et al. |
| 2016/0307199 A1 | 10/2016 | Patel et al. |
| 2017/0032694 A1 | 2/2017 | Brueckner et al. |
| 2017/0032695 A1 | 2/2017 | Brueckner et al. |
| 2017/0104778 A1 | 4/2017 | Shabtai et al. |
| 2017/0171230 A1 | 6/2017 | Leiderfarb et al. |
| 2018/0048534 A1 | 2/2018 | Banga et al. |
| 2018/0121657 A1 | 5/2018 | Hay et al. |
| 2018/0129805 A1 | 5/2018 | Samuel |
| 2018/0150554 A1 | 5/2018 | Le et al. |
| 2018/0159894 A1 | 6/2018 | Reddy et al. |
| 2018/0191770 A1 | 7/2018 | Nachenberg et al. |
| 2018/0219887 A1 | 8/2018 | Luo et al. |
| 2018/0225471 A1 | 8/2018 | Goyal et al. |
| 2018/0295154 A1 | 10/2018 | Crabtree et al. |
| 2018/0367563 A1 | 12/2018 | Pfleger de Aguiar et al. |
| 2018/0375892 A1 | 12/2018 | Ganor |
| 2019/0014153 A1 | 1/2019 | Lang et al. |
| 2019/0083876 A1 | 3/2019 | Morton et al. |
| 2019/0102564 A1 | 4/2019 | Li et al. |
| 2019/0164015 A1 | 5/2019 | Jones, Jr. et al. |
| 2019/0188615 A1 | 6/2019 | Liu |
| 2019/0222593 A1 | 7/2019 | Craig et al. |
| 2019/0258953 A1 | 8/2019 | Lang et al. |
| 2019/0289029 A1 | 9/2019 | Chawla et al. |
| 2019/0312890 A1 | 10/2019 | Perilli |
| 2019/0356684 A1 | 11/2019 | Sinha et al. |

(56) References Cited

U.S. PATENT DOCUMENTS

| | | | |
|---|---|---|---|
| 2019/0370473 | A1 | 12/2019 | Matrosov et al. |
| 2020/0184053 | A1 | 6/2020 | Kursun |
| 2020/0201992 | A1 | 6/2020 | Hadar et al. |
| 2021/0168170 | A1* | 6/2021 | Asai ................ G06Q 10/06312 |

OTHER PUBLICATIONS

Xie, F., Lu, T., Guo, X., Liu, J., Peng, Y., & Gao, Y. (2013). Security Analysis on Cyber-physical System Using Attack Tree. 2013 Ninth International Conference on Intelligent Information Hiding and Multimedia Signal Processing, 430—III. Attributes Quantification of Each Leaf (Year: 2013).*
ATC-NY, OSD172-D11, F172-D11-0024, Phase I SBIR Proposal, "SilverlineRT", Jul. 20, 2017, 16 pages.
H. Xu et al., "Attack Identification for software-defined networking based on attack trees and exension innovation methods," 2017 9th IEEE Intl. Conf. on Intelligent Data Acquisition and Advanced Computing Systems: Technology and Applications (IDAACS), Bucharest, 2017, pp. 485-489. (Year: 2017).
R.Wu et al., "An Attack Modeling Based on Hierarchical Colored Petri Nets," 2008 International Conference on Computer and Electrical Engineering, Phuket, 2008, pp. 918-921. (Year: 2008).
R. Maciel et al., "Impact of a DDoS attack on computer systems: An approach based on an attack tree model," 2018 Annual IEEE International Systems Conference (SysCon), Vancouver, BC, 2018, pp. 1-8 (Year: 2018).
2015 DFRWS Forensics Challenge, "Submitted Solutions and Source Code Released", GPU Malware Research, retrieved on Mar. 22, 2020 from http://www.cs.uno.edu/-golden/gpumalware-research.html, 5 pages.
Kimball, "Silverline Human Performance Detection (Silverline-HPD)", Phase 1 SBIR Proposal, Architecture Technology Corporation, SB172-007, D172-007-0014, Jul. 20, 2017, 17 pages.
Atighetchi et al., "Metrinome-Continuous Monitoring and Security Validation of Distributed Systems", Journal of Cyber Security and Information Systems vol. II, No. 1, Knowledge Management, Mar. 2014, pp. 20-26.
Baloch et al., "Comparative Study of Risk Management in Centralized and Distributed Software Development Environment", Sci. Int.(Lahore), vol. 26, No. 4, 2014, pp. 1523-1528.
Balzarotti et al., "The Impact of GPU-Assisted Malware on Memory Forensics: A Case Study", DFRWS 2015, Elsevier, Digital Investigation, vol. 14, 2015, pp. S16-S24.
Becker et al., "Applying Game Theory to Analyze Attacks and Defenses in Virtual Coordinate Systems," 41$^{st}$ International Conference on Dependable Systems & Networks (DSN), Jun. 2011, pp. 133-142.
Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.
"Cybersecurity," U.S. Department of Defense Instruction, No. 8500. 01, Mar. 14, 2014 (incorporating change effective Oct. 7, 2019), 58 pages, accessible via https://www.esd.whs.mil/Portals/54/Documents/DD/issuances/dodi/850001_2014.pdf.
"Cyberspace Operations," U.S. Air Force, Air Force Policy Directive 10-17, Jul. 31, 2012, 9 pages, accessible via https://fas.org/irp/doddir/usaf/afpd 10-17 .pdf.
Edwards et al., "Hajime: Analysis of a decentralized internet worm for IoT devices", RapidityNetworks, Security Research Group, Oct. 16, 2016, pp. 1-18.
Fisher, "Developing Software in a Multicore & Multiprocessor World," Klocwork White Paper, Klocwork.com., Sep. 2010, pp. 1-11.
Home Invasion 2.0, "Attacking Network-Connected Embedded Devices", retrieved from the internet on Jun. 20, 2018, https://media.blackhat.com/US-13/US-13-Crowley-Home-Invasion-2-0-WP.pdf, 15 pages.

"Identification and Significance of the Problem or Opportunity", Architecture Technology Corporation, Proposal No. F172-D12-0184, Topic No. OSD172-D12, 10 pages (undated).
Jones, "Software Defect Origins and Removal Methods," International Function Point Users Group, Capers Jones, Dec. 28, 2012, pp. 1-31.
Joyce et al., "MEGA: A Tool for Mac OS X Operating System and Application Forensics," Digital Investigation, vol. 5, Elsevier, Proceedings of the Digital Forensic Research Conference, Aug. 11-13, 2008, pp. 583-590.
Joyce, "TrestleHSM: Hierarchical Security Modeling for Naval Control Systems", Phase 1 SBIR Proposal, Topic: N181-051, Unified Cybersecurity System Modeling of Naval Control Systems, Architecture Technology Corporation, 25 pages.
Libicki, "Cyberdeterrence and Cyberwar," Rand Corporation, Project Air Force, 2009, 240 pages.
McHale, "The Aegis Combat System's continuous modernization", Military Embedded Systems, Retrieved on Mar. 22, 2020 from http://mil-Embedded.com/articles/the-aegis-combat-systems-continuous-modernization/, 8 pages.
McLinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12, 1 page (undated).
Porche III et al., "A Cyberworm that Knows no Boundaries", RAND Corporation, National Defense Research Institute, 2011, 55 pages.
PR Newswire, "ATCorp Releases CSAS-Cloud Security Analysis Suite for Applications in the Cloud", Architecture Technology Corporation, Feb. 26, 2016, 4 pages.
Quinlan et al., "ROSE User Manual: A Tool for Building Source-to-Source Translators," Draft User Manual, Version 0.9.11.115, Lawrence Livermore National Laboratory, Sep. 12, 2019, 337 pages.
Rahman et al., "Defect Management Life Cycle Process for Software Quality Improvement," World Academy of Science, Engineering and Technology International Journal of Computer and Information Engineering, vol. 9, No. 12, 2015 3$^{rd}$ International Conference on Artificial Intelligence, Modelling and Simulation, Nov. 24, 2015, pp. 241-244.
Richard III, "Memory Analysis, Meet GPU Malware", University of New Orleans, CERIAS, Oct. 22, 2014, retrieved from http://www.cerias.purdue.edu/news_and_events/events/security_seminar/details/index/popenihmencsf2v5mggg5ulfd4, 2 pages.
Robbio, "How Will A1 Impact Software Development?", Forbes Technology Council, Aug. 31, 2017, retrieved on Mar. 23, 2020 from https://www.forbes.com/sites/forbestechcouncil/2017/08/31/how-will-ai-impact-software-development/#325be7e7264d, 16 pages.
Rose: Main Page, Lawrence Livermore National Laboratory, retrieved on Mar. 23, 2020 from http://rosecompiler.org/ROSE_HTML_Reference/, 3 pages.
Schneier, "Attack Trees—Schneier on Security", Dr. Dobb's Journal, Dec. 1999, retrieved on Mar. 23, 2020 from https://www.schneier.com/academic/archives/1999/12/attack_trees.html, 9 pages.
Shiva et al., "Game Theory for Cyber Security," Proceedings of the Sixth Annual Workshop on Cyber Security and Information Intelligence Research, Article No. 34, Apr. 2010, 10 pages.
Sirianni, "A19-080 Cyber Security Tool Kits For Engineers and Soldiers," Phase 1 SBIR Proposal, Architecture Technology Corporation, 24 pages (undated).
Sironi et al., "Metronome: Operating System Level Performance Management via Self-Adaptive Computing", DAC 2012, Jun. 3-7, 2012, pp. 856-865.
Snyder et al., "Ensuring U.S. Air Force Operations During Cyber Attacks Against Combat Support Systems—Guidance for Where to Focus Mitigation Efforts," RAND Corporation, 2015, 37 pages.
Vasiliadis et al., "GPU-Assisted Malware", 2010 5$^{th}$ International Conference on Malicious and Unwanted Software, 2010, pp. 1-6.
"Cybersecurity," U.S. Department of Defense Instruction, No. 8500. 01, Mar. 14, 2014, 58 pages,accessible via. https://www.esd.whs.mil/Portals/54/Documents/DD/issuances/dodi/850001_2014.pdf.
"CYDEST: CYber DEfense Simulation Trainer", Air Force SBIR/STTR Award Details, Phase I, Award Details Status: Completed

(56) References Cited

OTHER PUBLICATIONS (Invited for Phase II) Start: Apr. 13, 2005 End Jan. 13, 2006, retrieved on Aug. 30, 2020 from URL: http://www.itfsbirsttr.com/award/AWARDDetails.aspx?pk=12036 (2 pages).
Architecture Tecnnology Corporation et al.", Cydest (Cyber Defense Simulation Trainer)," http://web.archive.org/web/20061107010247/www.atcorp.com/securesystems/cydest.html, Dec. 2005, 1 page.
ATC-NY et al.,"Cyber Defense Simulation Trainer (CYDEST)", CYDEST Congressional Briefing, Feb. 19, 2007, 1 page.
ATC-NY, SB172-007, D172-007-0014, Phase I SBIR Proposal, Silverline Human Performance Detection (Silverline-HPD), Jul. 20, 2017 (17 pages).
Bergstromb et al., "The Distributed Open Network Emulator: Using Relativistic Time for Distributed Scalable Simulation", Proceedings of the 20th Workshop on Principles of Advanced and Distributed Simulation, May 23-26, 2006, 7 pages.
Brueckner et al., "CYDEST Cyber Defense Simulation Trainer", ATC-NY a subsidiary of Architecture Technology Corporation, Oct. 29, 2007, 20 pages.
C.M.U. Entertainment Technology Center, "CyberSecurity", found at http://www.etc.cmu.edu/projects/cybersecurity/, Feb. 2000, 16 pages.
Carson et al., "NIST NET: A Linux-based network emulation tool" ACM SIGCOMM, Computer Communication Review, vol. 33, Issue 3, Jul. 2003, 16 pages.
Carver et al., "Military Academy Attack/Defense Network", IEEE Systems, Man, and Cybernetics Information Assurance and Security Workshop, West Point, NY, Jun. 17-19, 2002, 6 pages.
Crumb, Francis L., "Cyber Security Boot Camp graduates Class of '06", Academy Spirit, vol. 46, No. 33, Aug. 18, 2006, U.S. Air Force Academy, Colorado (1 page).
Crumb, Francis L., "Hackfest Highlights Cyber Security Boot Camp", Air Force Research Laboratory (AFRL) Information Directorate document, Oct./Nov. 2004 (1 page).
Davoli, "Virtual Square: all the virtuality you always wanted but you were afraid to ask," http://virtualsguare.org/copyright Renzo Davoli, May 27, 2004, 3 pages.
Davoli, "Virtual Square", Proceedings of the First International Conference on Open Source Systems, Genova, Jul. 11-15, 2005, 6 pages.
De Gusmao et al., "Abstract of Cybersecurity risk analysis model using fault tree analysis and fuzzy decision theory", 2018, International Journal of Information Management, pp. 1-3.
Duggirala et al., "Open Network Emulator", Jan. 15, 2005, available at URL: https://web.archive.org/web/2010*/http://csrl.cs.vt.edu/net_emulation.html (5 pages).
Honeynet Project, "Know Your Enemy: Defining Virtual Honeynets," http://old.honeynel.org/papers.virtual/, Jan. 27, 2003, 7 pages.
Howard et al., "A Common Language for Computer Security Incidents," Sandia National Laboratories Report, SAND9B 8667, Oct. 1998, 32 pages.
Keshav, "Real: A Network Simulator," Computer Science Division, Department of Electrical Engineering and Computer Science, University of California, Berkeley, Dec. 1988, 16 pages.
Krishna et al., "V-Netlab: A Cost-Effective Platform to Support Course Projects in Computer Security", Department of Computer Science, Stony Brook University, Jun. 2005, 7 pages.
Lathrop et al., "Information Warfare in the Trenches: Experiences from the Firing Range," U.S. Military Academy, Security education and critical infrastructures, Kluwer Academic Publishers Norwell, MA, USA .copyright, Jun. 23-26, 2003, 21 pages.
Lathrop et al., "Modeling Network Attacks", 12th Conference on Behavior Representation in Modeling and Simulation, 2003, pp. 401-407 (8 pages).
Lathrop et al., "Modeling Network Attacks", 12th Conference on Behavior Representation in Modeling and Simulation, May 2003, pp. 19-26 (8 pages).
Liljenstam et al., "RINSE: The Real-Time Immersive Network Simulation Environment for Network Security Exercises", Proceedings of the 19th Workshop on Principles of Advanced and Distributed Simulation (PADS), Jun. 2005, 10 pages.
McDonald, Chris, "A Network Specification Language and Execution Environment for Undergraduate Teaching", ACM SIGCSE Bulletin, vol. 23, Issue 1, Mar. 1991, DOI: 10.1145/107005.107012 (10 pages).
McGrath et al., "NetSim: A Distributed Network Simulation to Support Cyber Exercises", Institute for Security Technology Studies, Dartmouth College, Huntsville Simulation Conference, Mar. 9-11, 2004, Huntsville, Alabama, 6 pages.
Padman et al., "Design of a Virtual Laboratory for Information Assurance Education and Research", Proceedings of the 2002 IEEE, Workshop on Information Assurance and Security, U.S. Military Academy, West Point, Jun. 2002, 7 pages.
Proposal Author: Matthew Donovan; Topic Name and No. N182-131: Red Team in a Box for Embedded and Non-IP Devices; Title: Automated Cyber Evaluation System, Jun. 30, 2018, 24 pages.
Quinlan et al., "Rose User Manual: A Tool for Building Source-to-Source Translators", Draft User Manual, Version D.9.6a, Lawrence Livermore National Laboratory, Dec. 16, 2015 (169 pages).
Richard III, Golden G., "Memory Analysis, Meet GPU Malware", CERIAS, Oct. 22, 2014, retrieved 2021 from URL: https://www.cerias.purdue.edu/news_and_events/events/security_seminar/details/index/popenihmencsf2v5mggg5ulfd4 (3 pages).
Saic et al., "TeamDefend, A White Paper on Strengthening the Weakest Link: Organizational Cyber Defense Training", 17th Annual FIRST Conference, June 26-Jul. 1, 2005, 6 pages.
Saunders, "Simulation Approaches in Information Security Education", Proceedings of the Sixth National Colloquium for Information Systems Security Education, Redmond, Washington, Jun. 4-6, 2002, 15 pages.
Schafer et al., "The IWAR Range: A Laboratory for Undergraduate Information Assurance Education", Military Academy West Point, NY, Research paper, found at http://handle.dtic.mil/100.2/ADM08301, Nov. 7, 2000, 7 pages.
Schepens et al., "The Cyber Defense Exercise: an Evaluation of the Effectiveness of Information Assurance Education", 2003, 14 pages.
Stumpf et al., "NoSE-building virtual honeynets made easy", Darmstadt University of Technology, Department of Computer Science, D-64289 Darmstadt, Germany, 2005, 11 pages.
Stytz et al., "Realistic and Affordable Cyberware Opponents for the Information Warfare BattleSpace," Jun. 2003, 42 pages.
Varga, "The OMNeT ++ Discrete Event Simulation System", Department of Telecommunications, Budapest University of Technology and Economics, Proceedings of the European Simulation Multiconference, Jun. 2001, 7 pages.
Vrable et al., "Scalability, Fidelity, and Containment in the Potemkin Virtual Honeyfarm," SOSP, Oct. 23-26, 2005, 15 pages.
Wang et al., "The design and implementation of the NCTUns 1.0 network simulator", Computer Networks, vol. 42, Issue 2, Jun. 2003, 23 pages.
White et al., "Cyber Security Exercises: Testing an Organization's Ability to Prevent, Detect and Respond to Cyber Security Events," Proceeding of the 37th Hawaii International Conference on System Sciences, Jan. 2004, 10 pages.
Wikipedia-OpenCL, Mar. 29, 2017, Retrieved from https://en.wikipedia.org/wiki/OpenCL, 23 pages.
Zeng et al., "GloMoSim: A Library for Parallel Simulation of Large-scale Wireless Networks" ACM SIGSIM Simulation Digest, vol. 28, Issue 1, Jul. 1998, 8 pages.

* cited by examiner

SYSTEMS AND METHODS FOR CYBER-PHYSICAL THREAT MODELING

CROSS-REFERENCE TO RELATED APPLICATIONS

This application relates to U.S. patent application Ser. No. 16/012,651, filed Jun. 19, 2018, titled "Systems and Methods for Improving the Ranking and Prioritization of Attack-Related Events," and U.S. patent application Ser. No. 16/267,304, filed Feb. 4, 2019, titled "Systems and Methods for Unified Hierarchical Cybersecurity," each of which is hereby incorporated by reference in its entirety.

TECHNICAL FIELD

This application relates generally to methods and systems for threat modeling in cyber-physical systems.

BACKGROUND

With ever-increasing reliance on technology, the threat of cyber-attacks has migrated to the physical plane. Furthermore, due to increased automation, physical systems are now facing a host of virtual adversaries. This adds a whole new dimension of attack surfaces. For example, automation can leave physical systems extremely vulnerable to radio-based attacks. The physical systems may further be vulnerable to both replay and spoofing attacks.

For example, integrated circuit lifecycle attacks, while difficult to execute, are of devastating consequences. Examples of such attacks have affected military grade equipment in the past. While evidence of malicious access can be discovered through intrusion detection systems, the true culprit is difficult to find.

The conventional threat modeling tools, although effective in the virtual plane, are not do not work for physical systems. Much of the emphasis is made on attacks over a network, disregarding the physical attack surface. This deficiency leaves physical systems vulnerable to a plethora of physical attacks, such as USB drive-by attacks, lifecycle attacks, and the like. For example, if a physical system has unused physical interfaces readily available (USB, as well as other serial ports), a conventional threat modeling tools fail to warn an administrative analyst about the possibility of both external and internal adversaries using the physical attack against the interface. For instance, one of such undetected physical attacks may be that a USB drive, acting as a keyboard, injects keystrokes to gain and maintain access to a system.

SUMMARY

What is therefore desired is to have a system that builds threat modeling tools in cyber-physical systems that analyze and prioritize the impact of physical attacks. Embodiments disclosed herein describe a threat modeling tool or a security application that characterizes and mitigates threats via attack surface testing and indexing threat models using attack tree structures. The threat modeling tool is configured for analysis of cyber-physical systems. An analytic server running the security application may discover and report vulnerabilities in both a high-level report and a low-level overview of all possible ways an attack can be executed by displaying a detailed report of sub-tasks.

To address the security of cyber-physical critical infrastructure and fill the need for secure operation maintenance and prevention of data leaks, embodiments disclosed herein build a threat modeling tool or a security application for cyber-physical systems. The threat modeling tool is based upon a technology that analyzes the security of applications by modeling high-level risks (e.g., to service availability) in terms of testable, low-level items in a generalization of an attack tree approach. Metadata, such as remediation cost and impact, are attached to individual graph nodes in the attack tree. Furthermore, automated testing descriptions are attached to individual graph nodes when necessary. A graph model (e.g., attack tree model) may compute the value of node functions (such as total remediation cost or lowest cost yet sufficient sub-item) in a hierarchical structure to give the analyst overall statistics and a prioritized set of action items.

In one embodiment, a computer-implemented method comprises instantiating, by a computer, a first sub attack tree for a first cyber-physical system within a distributed network infrastructure, the first sub attack tree being based upon a first physical configuration of the first cyber-physical system; instantiating, by the computer, a second sub attack tree for a second cyber-physical system within the distributed network infrastructure, the second sub attack tree being based upon a second physical configuration of the second cyber-physical system; generating, by the computer, a machine-readable markup file of an attack tree of the distributed network infrastructure, the attack tree containing the first sub attack tree and the second sub attack tree, and the machine-readable markup file containing a first identifier of the first sub attack tree and a second identifier of the second sub attack tree; receiving, by the computer in real-time, electronic notifications of alerts from a plurality of devices in the first and second cyber-physical systems; and detecting, by the computer, one or more attacks on the distributed network infrastructure based upon the alerts by executing a logic of the attack tree, wherein executing the logic of the attack tree comprises traversing the first sub attack tree based on the first identifier, the second sub attack tree based on the second identifier, and a parent node hierarchically above the first and second sub attack trees to determine an impact on the distributed network infrastructure based upon the alerts.

In another embodiment, a system comprises a non-transitory storage medium storing a plurality of computer program instructions; and a processor electrically coupled to the non-transitory storage medium and configured to execute the plurality of computer program instructions to: instantiate a first sub attack tree for a first cyber-physical system within a distributed network infrastructure, the first sub attack tree being based upon a first physical configuration of the first cyber-physical system; instantiate a second sub attack tree for a second cyber-physical system within the distributed network infrastructure, the second sub attack tree being based upon a second physical configuration of the second cyber-physical system; generate a machine-readable markup file of an attack tree of the distributed network infrastructure, the attack tree containing the first sub attack tree and the second sub attack tree, and the machine-readable markup file containing a first identifier of the first sub attack tree and a second identifier of the second sub attack tree; receive electronic notifications of alerts from a plurality of devices in the first and second cyber-physical systems; and detect one or more attacks on the distributed network infrastructure based upon the alerts by executing a logic of the attack tree, wherein executing the logic of the attack tree comprises traversing the first sub attack tree based on the first identifier, the second sub attack tree based on the second identifier, and a parent node hierarchically above the first and second sub attack trees to determine an impact on the distributed network infrastructure based upon the alerts.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
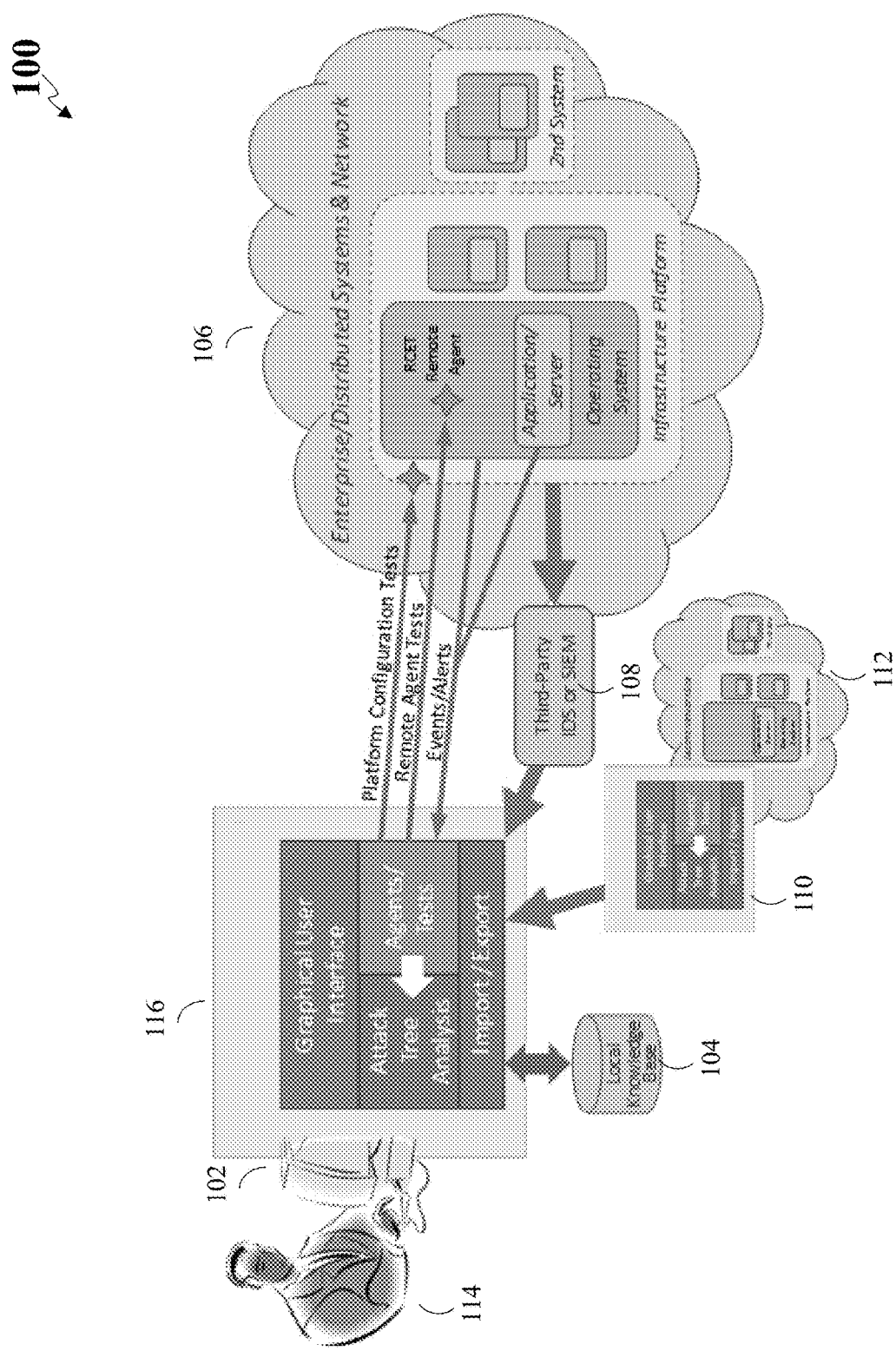
FIG. 1 illustrates a computer system for cyber-physical threat modeling, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an analytic server running a security application. The security application may comprise a threat modeling tool that analyzes and prioritizes the impact of security alerts and security-relevant events in cyber-physical systems. The analytic server running the security application may model threats using attack tree concepts and constructive hierarchical models, with structural enhancements to better describe risks to complex distributed systems.

Specifically, the analytic server running the security application may customize the attack tree structures to the cyber-physical systems. The analytic server may integrate physical models and circuit datasheet analysis into the attack tree model. The analytic server may analyze all relevant integrated circuit datasheets, produce a report, and display attack threats over radio and wired communication links.

For example, the analytic server may detect vulnerabilities due to misconfiguration, hardware lifecycle attack threats based on the data provided by the circuit datasheets, physical access attacks such as BadUSB, radio based spoofing attacks; as well as a whole host of threats through more conventional communication links (e.g., Ethernet). Aside from the actual vulnerabilities, the report may include threat likelihood, impact, and remediation costs. The report may also include possible mitigation and further testing suggestions (e.g., in cases of hardware lifecycle attacks).

The methods and systems disclosed herein may be general and can be applied to a wide variety of cyber-physical security problems (e.g., via plug-ins), both in the system design phase and for ongoing monitoring. Alternatively, the methods and systems disclosed herein may be customized for a specific area. For example, the models and user interface may be customized for transportation and aviation use. Specifically, the analytic server may add physical models and aviation-specific knowledge to the tree models in order to analyze risks to the overall cyber-physical aviation network. Physics-based models, for instance, can be used to determine whether data reported by ADS-B (automatic dependent surveillance-broadcast) transponders or weather stations are consistent with other reports, or whether it is aberrant enough to warrant investigation. The possibility of lifecycle attacks may be reported through the study of circuit datasheets. The analytic server may determine parts of the physical system that allow an adversary to embed malicious integrated circuits, which later can grant access to the system. Using circuit datasheet analysis, the analytic server may search for integrated circuit vulnerabilities (e.g., dead space) and recommend ways to test for hardware Trojans, such as logic and side-channel testing.

The embodiments disclosed herein may go beyond the tree-based modeling by incorporating physics-based models, extensive metadata, computed attributes (such as cost or impact), and automated testing of leaf nodes in the attack tree. The conventional solutions provide a static attack tree structure. The embodiments disclosed herein may build dynamic tree models, which can be used for automated analysis.

FIG. 1 illustrates components of a system 100 for cyber-physical threat modeling, according to an embodiment. The system 100 may include an analytic server 102 with a local knowledge database 104, enterprise/distributed systems and network infrastructure 106, a third party intrusion detection system (IDS) or security information and event management (SIEM) system 108, a second analytic server 110 connected with a second network of distributed systems 112. FIG. 1 shows how a system fits within a multi-site real-time monitoring system. The analytic server and other system devices may be connected via hardware and software components of one or more networks. Examples of the network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The analytic server 102 may be any computing device comprising a processor and other computing hardware and software components, configured to build a security system containing one or more security applications. The analytic server 102 may be logically and physically organized within the same or different devices or structures, and may be distributed across any number of physical structures and locations (e.g., cabinets, rooms, buildings, cities). The analytic server 102 may execute automated configuration and run-time status queries. At the same time, the analytic server 102 may receive logging and alert information from the servers, endpoints, and network devices under management. For example, the analytic server 102 may receive logging and alert information from the devices in the enterprise/distributed systems and network infrastructure 106, the second analytic server 110 connected with the second network of distributed systems 112. The analytic server 102 may also query existing IDS and SIEM systems for alert data, and receive such data asynchronously from the third party IDS or SIEM 108. The logging and alert information collected on each device may be collected via standard protocols such as syslog, Windows Event Logs, secure shell (SSH), or the Simple Network Management Protocol (SNMP). The OASIS® Structured Threat Information eXpression (STIX) is a natural way of describing the logging and alert data and is supported in the security system via the OASIS Trusted Automated Exchange of Intelligence Information (TAXII) transport. In this way, the security system may leverage future/third-party advances in detection algorithms.

The analytic server 102 may build a security application 116 by using an attack tree model based on a set of aggregation rules, which dictate how various metrics are computed in terms of lower-level data. In the security application 116, the analytic server 102 may support a large set of aggregation functions, and the user can define custom functions if needed. The analytic server 102 may refine the interface for aggregation functions and provide a set of aggregators specific to assessing real-time threat indicator data. The results of the aggregation rules can be in standard form such as National Institute of Standards and Technology (NIST) Common Vulnerability Scoring System (CVSS) vectors or costs, or in mission domain-specific terms. As data arrives, the metrics will be recomputed in real-time, "bubbling up" the tree as appropriate.

After the analytic server 102 prioritizes and analyzes the aggregate impact of multiple alters, IDS notifications, and other attack indicators, the analytic server 102 may display the results on a user interface of the analytic server or on a computing device (not shown) associated with the analyst 114. The analyst 114 may easily see which alerts have the most significant "big picture" impact and which can be triaged for later assessment by low-level personnel. When cost or other metrics are available within the model, the analyst 114 may see which proposed remediation strategies have the most significant impact for the least cost or least mission disruption.

The analytic server 102 may operate the security application 116 in a federal manner, where portions of the tree model located at various sites or administrative domains are maintained by local experts. At alternate sites, headless copies of security applications aggregate site-local data and alerts; the results may provide aggregated inputs to one or more "master" instances for analyst use. Such an architecture may allow for voluminous, potentially sensitive alert and IDS data to stay local (e.g., for forensic purposes) while enabling the entire system to scale up for very large enterprises.

Overall, the analytic server 102 may use the security application 116 to help the analyst 114 sort out false alarms from true attacks that have minimal impact on mission success, and highlight the attacks that may have to be addressed immediately and possibly automatically. Therefore, the analytic server 102 may save time and reduce cognitive burden on overloaded security analysts.

The security application 116 built by the analytic server 102 may include several components or modules, such as an import/export module, an attack tree analysis module, an agent tests module, a graphical user interface module. The import/export module may receive data from or transmit data to local knowledge database 104. The import/export module may also receive logging and alert information from devices under management, such as the servers, endpoints, and network devices in the distributed systems and network infrastructure 106 through a third-party IDS or SIEM 108. The agent testes module may receive events and alerts from the operating system of the infrastructure platform within the enterprise/distributed systems and network infrastructure 106 or applications and servers within the operating system. In addition, the agent tests module may perform configuration tests and remote agent tests on the operating system of the infrastructure platform within the enterprise/distributed systems and network infrastructure 106. The agent tests module may interact with the attack tree analysis module to determine and analyze the security attacks. The attack tree module may comprise a set of aggregation rules for computing various metrics on threats and possible attacks on different devices. The graphical user interface module may comprise graphical interactive elements configured to display analysis results and threat indicator data, receive user configuration, and any other interactive elements that allow the user to interact with the analytic server 102.

The local knowledge database 104 may be any non-transitory machine-readable media associated with the analytic server 102. The local knowledge database 104 may be configured to store data, including logging and alert information from different devices and systems, the attack tree model comprising aggregation rules and configurations for analyzing security threats and attacks, the metrics computed based on the aggregation rules in the attack tree model, the ranking and prioritization of attack-related events. The local knowledge database 104 may also include any other data that is helpful for analyzing security alerts and server/endpoint/network events.

The enterprise/distributed systems and network infrastructure 106 may be any number of devices and systems connected with each other within a distributed network. Such devices and systems may be under management of the analytic server 102. The enterprise/distributed systems and network infrastructure 106 may comprise infrastructure platform with operating system for servers and applications. The operating system may receive remote agent tests from the analytic server 102. The infrastructure platform of one system may be connected to another system (e.g., a second system). The infrastructure platform of each system may transmit logging and alert information to the analytic server 102 via a third-party IDS or SIEM 108.

The enterprise/distributed systems and network infrastructure 106 may be a unified system comprising a plurality of physical-cyber systems. The analytic server 102 may manage the security of the unified system 106 based on an attack tree. The analytic server 102 may build a high-level attack tree of the unified system by aggregating the sub attack trees of the systems. Specifically, the analytic server may instantiate a sub attack tree for each cyber-physical system within the distributed network infrastructure 106. The analytic server 102 may determine how the interconnection of the plurality of cyber-physical systems may affect the unified system security. The analytic server 102 may build the attack tree based on a set of aggregation rules. Each cyber-physical system may integrate sensing, computation, control and networking into physical objects/devices and infrastructures that are connected with each other.

The attack tree of the unified system may make reference to sub attack trees of the plurality of cyber-physical systems. The analytic server 102 may refer to the sub attack trees as files or via URL (Uniform Resource Locator) or URI (Uniform Resource Identifier). For example, when the analytic server 102 traverses the attack tree of the unified system, the analytic server 102 may reach a portion of the attack tree that is a reference to a sub attack tree of a cyber-physical system. The reference may be a URL or URI. The analytic server 102 may access or refer to the sub attack tree based on the identifier (e.g., URL or URI) in runtime. The analytic server 102 may generate a machine-readable markup file of an attack tree to store the identifiers of the plurality of sub attack trees of the cyber-physical systems.

Furthermore, the analytic server 102 may generate a set of parameters (e.g. parameterized references) based on security analysis from the traversing of the attack tree, while refer to the sub attack trees. When the analytic server 102 refers to the sub attack trees, the analytic server 102 may transmit the set of parameters to the sub attack trees. Sequentially, each sub attack tree may execute the logic for detecting attacks based on the set of parameters.

The third-party IDS or SIEM 108 may be any device or software application that monitors a network or systems for malicious activity or policy violations. The SIEM system may report any malicious activity or violation to an administrator or analyst. The SIEM may combine outputs from multiple sources. The third-party IDS or SIEM 108 may plug in the existing systems, aggregate the alerts and events from various systems and devices and import the alerts and events into the security application 116 running on the analytic server 102.

The second analytic server 110 connected with the second network of distributed systems 112 may be a similar system architecture as the analytic server 102 connected with the enterprise/distributed systems and network infrastructure 106. The different analytic servers may be in communication with each other and feed alerts and events information into each other. The system 100 may comprise any number of such analytic servers and connected networks of distributed systems.

Figure 2:
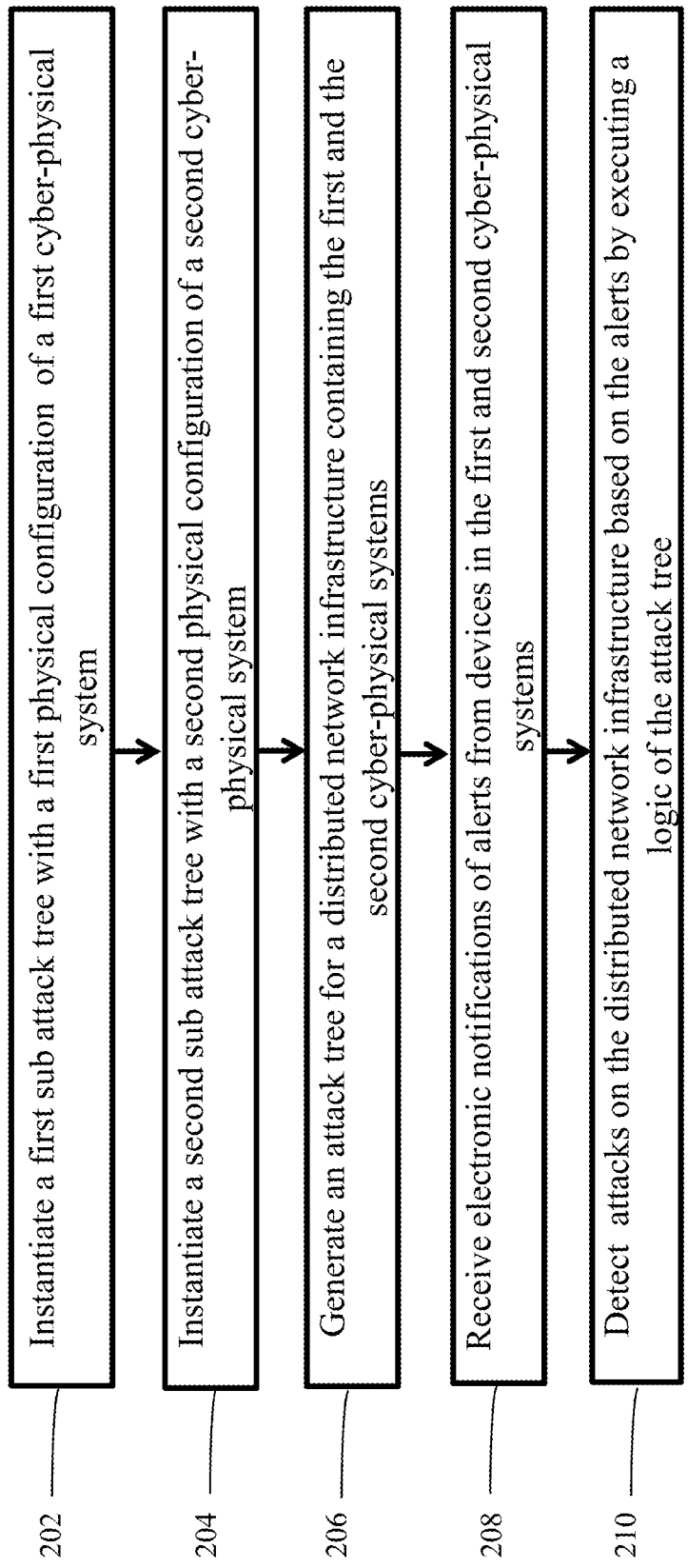
FIG. 2 illustrates a flowchart for improving the security of cyber-physical systems, according to an embodiment.

FIG. 2 illustrates a flowchart 200 for improving the security of cyber-physical systems, according to an embodiment. Other embodiments may comprise additional or alternative steps, or may omit some steps altogether.

At step 202, the analytic server may instantiate a first sub attack tree with a first physical configuration associated with a first cyber-physical system. A unified system may be a distributed network infrastructure comprising a plurality of cyber-physical systems. The plurality of cyber-physical systems may be owned by different entities. For example, a first entity may own the first cyber-physical system. A second entity may own a second cyber-physical system. The analytic server may instantiate a sub attack tree for each cyber-physical system within the distributed network infrastructure.

To use the attack tree model in cyber-physical systems, the analytic server may integrate physical models and circuit datasheet analysis into the attack tree model. Specifically, for a first cyber-physical system, the analytic server may instantiate the first sub attack tree based on a first physical configuration of the first cyber-physical system. The first physical configuration may comprise attack detection rules, metadata, various attributes of the first cyber-physical system. The attack detection rules, metadata, various attributes may be from user configuration and/or local knowledge in a local database associated with the first cyber-physical system.

The first sub attack tree may be an executable logic for detecting attacks within the first cyber-physical system. Based on the attack detection rules of the first physical configuration, the analytic server may generate the first sub attack tree that shows how the first cyber-physical system can be attacked, and describes threats on the first cyber-physical system and possible attacks to realize those threats. The analyst server may be able to associate different metadata, various attributes from the physical configuration (e.g., user configuration and/or local knowledge) on the first cyber-physical system with items of the first sub attack tree and test the systems in various ways.

The analytic server may instantiate the first sub attack tree with a first set of parameterized references. The first set of parameterized references may be a set of parameters available for the first sub attack tree to execute the logic to detect attacks. The analytic server may generate the first sub attack tree based on a template. The template may take the attack detection rules, metadata, various attributes from user configuration and/or local knowledge as input and output an attack tree. In some embodiments, the first cyber-physical system may generate its own sub attack tree. The sub attack tree may be stored in the first cyber-physical system.

At step 204, the analytic server may instantiate a second sub attack tree with a second physical configuration associated with a second cyber-physical system. As discussed above, a distributed network infrastructure (e.g., unified system) may comprise a plurality of cyber-physical systems. Each cyber-physical system may have its own sub attack tree to monitor the system and analyze security threats and attacks. For a second cyber-physical system, the analytic server may instantiate a second sub attack tree based on a second physical configuration of the second cyber-physical system. The second physical configuration may comprise attack detection rules, metadata, various attributes of the second cyber-physical system. The attack detection rules, metadata, various attributes may be from user configuration and/or local knowledge in a local database associated with the second cyber-physical system.

The second sub attack tree may be an executable logic for detecting attacks within the second cyber-physical system. Based on the attack detection rules of the second physical configuration, the analytic server may generate the second sub attack tree that shows how the second cyber-physical system can be attacked, and describes threats on the second cyber-physical system and possible attacks to realize those threats. The analyst server may be able to associate different metadata, various attributes from the physical configuration (e.g., user configuration and/or local knowledge) on the second cyber-physical system with items of the second sub attack tree and test the systems in various ways.

The analytic server may instantiate the second sub attack tree with a second set of parameterized references. The second set of parameterized references may be a set of parameters available for the second sub attack tree to execute the logic to detect attacks. The analytic server may generate the second sub attack tree based on a template. The template may take the attack detection rules, metadata, various attributes from user configuration and/or local knowledge as input and output an attack tree. In some embodiments, the second cyber-physical system may generate its own sub attack tree. The sub attack tree may be stored in the second cyber-physical system. The analytic server may perform the process discussed above to instantiate a sub attack tree for each cyber-physical system within the distributed network infrastructure (e.g., unified system).

At step 206, the analytic server may generate a machine-readable markup file of an attack tree for the distributed network infrastructure (e.g., unified system) containing the first and second cyber-physical systems. The attack tree for the distributed network infrastructure may comprise the sub attack tree of each cyber-physical system (including the first and second cyber-physical systems) within the distributed network infrastructure. The analytic server may build a dynamic attack tree, which can be used for automated analysis. The attack tree is in a hierarchical structure comprising a root node and one or more child nodes, the root node representing a higher-level operating condition of an attack, and each of the one or more child nodes representing a lower-level operating condition of the attack.

The machine-readable markup file may be an Extensible Markup Language file. The markup file may contain identifiers of the plurality of sub attack trees of the plurality of cyber-physical systems, including a first identifier of the first sub attack tree and a second identifier of the second sub attack tree. The analytic server may manage the security of the distributed network infrastructure. The analytic server may generate the machine-readable markup file to record the identifier of each sub attack tree. The identifier of each sub attack tree may be URL or URI.

The attack tree model may be an executable logic for detecting attacks within the distributed network infrastructure. The attack tree of the distributed network infrastructure may be able to determine various security-relevant metrics for the unified system as a whole. In operation, the analytic server may aggregate the plurality of sub attack trees of the cyber-physical systems to build the attack tree for the distributed network infrastructure (e.g., unified system). The analytic server may determine how the aggregation of the plurality of cyber-physical systems may affect the unified system security. Emergent vulnerabilities may appear due to aggregation of specific pairs of systems. A particular system may impart crosscutting concerns on all other systems. Another pairwise combination may result in a "cross product" of model sub-trees.

The analytic server may build the attack tree based on a set of aggregation rules and other attack detection rules, which dictate how various metrics are computed in terms of lower-level data. The analytic server may support a large set of aggregation functions and attack detection rules. The analytic server may determine the impacts of the interconnection of the plurality of cyber-physical systems on the distributed network infrastructure based on the set of aggregation rules. For instance, the analytic server may determine how the interconnection of the plurality of cyber-physical systems may affect the unified system security. For example, while the first and second cyber-physical systems are each secure locally, the analytic server may determine the security threats produced by the interconnection of the first and second cyber-physical systems. The analytic server may also determine any changes in one or more security attributes of the first and second cyber-physical systems and the unified system. The analytic server may automatically update one or more nodes in the attack tree to reflect the changes.

At step 208, the analytic server may monitor systems and receive electronic notifications of alerts in real-time from a plurality of devices in the first and second cyber-physical systems. The analytic server may monitor various devices of the plurality of cyber-physical systems connected with each other within the distributed network infrastructure. For example, the analytic server may use physics-based models to determine threats and attacks on the physical devices within the plurality of cyber-physical systems. The analytic server may monitor and collect the testable results of the physical devices, which correspond to the leaf nodes of the attack tree.

For example, in transportation and aviation use, the analytic server may use physics-based models to determine whether data reported by ADS-B (automatic dependent surveillance-broadcast) transponders or weather stations are consistent with other reports, or whether it is aberrant enough to warrant investigation. Automatic dependent surveillance-broadcast (ADS-B) is a surveillance technology in which an aircraft determines its position via satellite navigation and periodically broadcasts it, enabling it to be tracked.

In addition, the analytic server may study circuit datasheets to detect lifecycle attacks. The analytic server may determine parts of the physical system that allow an adversary to embed malicious integrated circuits, which later can grant access to the system. Using circuit datasheet analysis, the analytic server may search for integrated circuit vulnerabilities (e.g., dead space) and recommend ways to test for hardware Trojans, such as logic and side-channel testing.

The analytic server may detect vulnerabilities due to misconfiguration, hardware lifecycle attack threats based on the data provided by the circuit datasheets, physical access attacks such as BadUSB, radio based spoofing attacks (ADS-B spoofing), as well as a whole host of threats through more conventional communication links (e.g., Ethernet). BadUSB is a dangerous USB security flaw that allows attackers to turn a simple USB device into a keyboard, which can then be used to type malicious commands into the victim's computer.

The analytic server may monitor a network with multiple heterogeneous systems by receiving alerts from external sensors and intrusion detection systems. Such devices and systems may be under management of the analytic server. The analytic server may receive logging and alert information from the infrastructure platform of the distributed systems and network infrastructure via a third-party IDS or SIEM. The third-party IDS or SIEM may plug in the existing systems, aggregate the alerts and events from various systems and devices and import the alerts and events into the analytic server.

At step 210, the analytic server may detect one or more attacks on the distributed network infrastructure based on the alerts using the attack tree. Specifically, the analytic server may execute the logic of the attack tree. The analytic server may traverse the first sub attack tree based on the first identifier, the second sub attack tree based on the second identifier, and a parent node hierarchically above the first and second sub attack trees to determine an impact on the distributed network infrastructure based on the alerts.

The analytic server may follow the logic of the attack tree model by traversing the attack tree (including the first and second sub attack trees) from bottom up and determine if the alerts and events data satisfy the operating conditions of the nodes. In operation, the analytic server may collect the test results of low-level testable results of the physical devices that correspond to the leaf nodes in the attack tree. From the bottom up, the analytic server may perform computation based on the test results using the attack tree logic.

From the bottom up, child nodes are lower-level operating conditions of an attack, at least one of the child nodes may have to be satisfied to make the direct parent node true, the parent node may represent higher-level operating condition;

when the root is satisfied (e.g., the highest level operating condition is satisfied), the attack is complete. By traversing the attack tree from bottom up, the analytic server may traverse the first and second sub attack trees and a parent node hierarchically above the first and second sub attack trees. Based on the traversing, the analytic server may determine how the alerts from the first and second cyber-physical systems may affect the distributed network infrastructure as a whole.

The analytic server may determine an impact score for each of the one or more attacks by correlating physical configuration data of the plurality of cyber-physical systems (including the first and second cyber-physical systems). For example, the analytic server may correlate context and configuration data from disparate cyber-physical systems and determine overall system risk and impact. The analytic server may not only determine if the combination of correlated data indicates an attack, but also how much of an impact the attack might have on the distributed network infrastructure. In addition to using the attack tree to determine the security attacks (e.g., threat likelihood) on various nodes of the attack tree, the analytic server may also determine the impacts of the attacks on the various nodes, and the costs to remedy the impacts on the various nodes.

The analytic server may perform automated evaluations and computations over the attack tree model, testing on-line to see whether particulate vulnerabilities are present or known-weak configurations or libraries are in use. In addition, by correlating information from multiple sources, the analytic server may be able to learn context for alerts and distinguish likely false alarms, as well as true, but unimportant, alerts. Thus, the analytic server may reduce false positives.

When the analytic server traverses the attack tree, the analytic server may need to access the sub attack tree of each cyber-physical system. The analytic server may access the markup file to retrieve the identifiers of the sub attack trees of the cyber-physical systems (including the first and second cyber-physical systems) within the distributed network infrastructure. For example, the analytic server may traverse the first sub attack tree based on the first identifier, the second sub attack trees based on the second identifier. The identifiers may be the URL or URI.

In operation, when the analytic server traverses the attack tree of the distributed network infrastructure at runtime, the analytic server may reach a portion of the attack tree that is a reference to a sub attack tree of a cyber-physical system. The reference may be a URL or URI. The analytic server may access or refer to the sub attack tree based on the identifier (e.g., URL or URI) at runtime. Furthermore, the analytic server may generate a set of parameters (e.g. parameterized references) based on security analysis from traversing the attack tree, while refer to the sub attack tree. When the analytic server refers to the sub attack tree, the analytic server may transmit the set of parameters to the sub attack tree. Sequentially, the sub attack tree may execute the logic for detecting attacks based on the set of parameters.

After the analytic server detects the one or more attacks in the distributed network infrastructure of the cyber-physical systems, the analytic server may rank and prioritize the one or more attacks based on the impact scores. The analytic server may generate in real-time reports in standard formats. The analytic server may display the reports in a dashboard of a user interface based on the ranking. The reports in the dashboard may comprise the list of the prioritized attacks. The reports may comprise security overview results and recommendation actions for the distributed network infrastructure and each cyber-physical system to mitigate the one or more attacks. For example, the report may include possible mitigation and further testing suggestions. The analytic server may automatically respond to one or more higher priority attacks.

Figure 3:
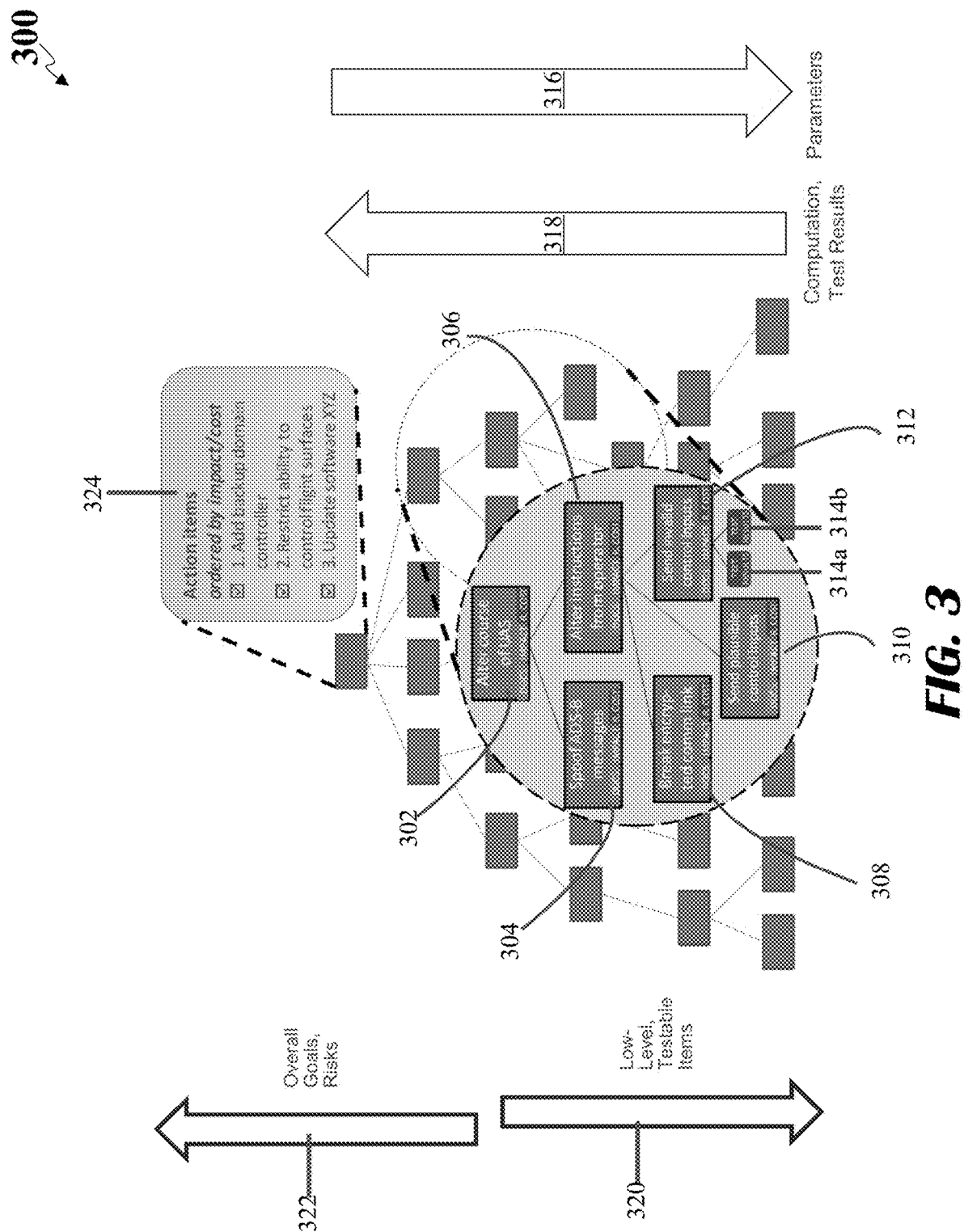
FIG. 3 illustrates an example of an attack tree, according to an embodiment.

FIG. 3 illustrates an example of an attack tree 300, according to an embodiment. The attack tree may show how a target can be attacked or describe threats to a system. The attack tree may show how an adversary's aims can be achieved in terms of sub-goals and system configuration choices. The attack tree may be a multi-level diagram consisting of one root, leaves, and children. From the bottom up, child nodes are conditions, which may have to be satisfied to make the direct parent node true; when the root is satisfied, the attack is complete. Each node may be satisfied only by its direct child nodes. A node may be the child of another node; in such a case, it becomes logical that multiple steps may have to be taken to carry out an attack.

The figure shows an excerpt of an attack tree that describes an attack on altering course of UAS (unmanned aircraft systems) 302. The altering course of UAS may comprise attacks of spoofing ADS-B messages 304 and altering instructions from operator 306. The altering instructions from operator 306 may comprise breaking encrypted communication link 308, sending plausible control inputs 310, and sending invalid control inputs 312. To determine whether there are invalid control inputs 312, the analytic server may need to monitor and collect test results 314a, 314b of bottom leaf nodes, such as various physical devices of the cyber-physical systems.

The analytic server may determine the logic of attack tree based on the parameters 316 (e.g., physical configurations) of the cyber-physical system. Based on such a logic of attack tree, the analytic server may detect attacks and determine overall goals and risks 322 on the system by traversing the attack tree from bottom up. In operation, the analytic server may collect the test results of low-level testable items 320. From the bottom up, the analytic server may perform computation based on the test results 318 using the attack tree logic.

Specifically, from the bottom up, the child nodes are lower-level operating conditions of an attack, at least one of the child nodes may have to be satisfied to make the direct parent node true, the parent node may represent higher-level operating condition; when the root is satisfied (e.g., the highest level operating condition is satisfied), the attack is complete.

In the process of traversing the attack tree from the bottom up, the analytic server may determine the threat likelihood, impact, remediation cost on each node of the attack tree. The analytic server may use the attack tree based threat modeling to produce multi-layer reports. In addition to the threats and their impacts, the report may reveal lower level sub-threats, giving an administrative analyst a detailed security overview of the cyber-physical system. After the traversing of attack tree reaches the root node, the analytic server may generate a report 324 comprising security overview results and recommendation actions for the whole system. As shown in the figure, the report 324 may comprise a list of action items for improving the system security. For example, the report 324 may include possible mitigation and further testing suggestions. The list of action items may be ordered by the impact and/or cost.

Figure 4:
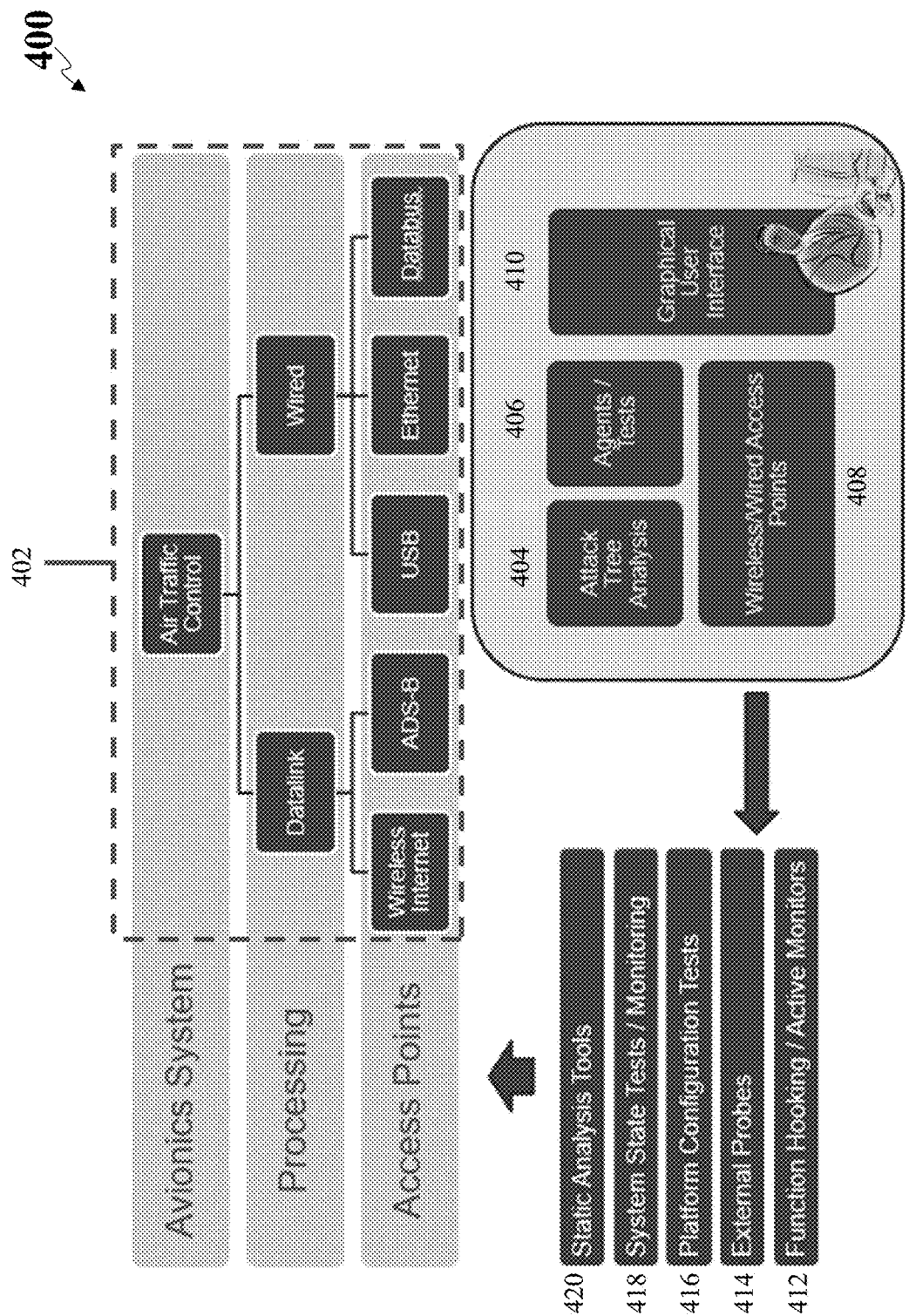
FIG. 4 illustrates an example of cyber-physical threat modeling in air traffic control, according to an embodiment.

FIG. 4 illustrates an example of cyber-physical threat modeling 400 in air traffic control, according to an embodiment. In this example, the attack tree 402 may comprise the executing logic of attacks on the air traffic control. More specifically, the attacks on air traffic control may comprise attacks on datalink and attacks on wired links. The attacks on datalink may comprise wireless Internet and ADS-B. The attacks on wired links may comprise USB, Ethernet, and data bus.

To determine the threats on the air traffic control, the analytic server may execute the logic of the attack tree from the bottom up. Specifically, the analytic server may perform attack tree analysis 404, agent tests 406, wireless and wired access points test 408. The analytic server may also generate a graphical user interface (GUI) 410 to display the results. In the wireless and wired access point test 408, the analytic server may check the status of the access points of the leaf nodes. For example, the analytic server may monitor and collect the test results of the wireless Internet, ADB-S, USB, Ethernet, and data bus. Based on such test results, the analytic server may perform the attack tree analysis 404 by following the logic of the attack tree from the bottom up. In addition, the analytic server may perform agent test 406 when traversing the attack tree. In the agent test 406, the analytic server may determine the status of the node based on the physical configuration. The physical configuration may comprise attack detection rules, metadata, various attributes of the cyber-physical systems.

The analytic server may perform various computation modules while traversing the attack tree from the bottom up, including function hooking and active monitor module 412, external probe module 414, platform configuration test module 416, system state test and monitoring module 418, and static analysis tools 420. The function hooking and active monitor module 412 may monitor the inputs and outputs of functions to determine whether the inputs and outputs are consistent with the cyber-physical system configuration. The external probe module may 414 monitor the logical signals of the cyber-physical system and collect status of the physical devices using external testing. The system state test and monitoring module 418 may test and monitor the status of the physical devices from the inside. The system state test and monitoring module 418 and platform configuration test module 416 may perform tests about the configuration and disposition of the cyber-physical systems. The static analysis tools 420 may perform analysis about the structure of source code and the properties of the source code in the physical devices of the cyber-physical systems.

Figure 5:
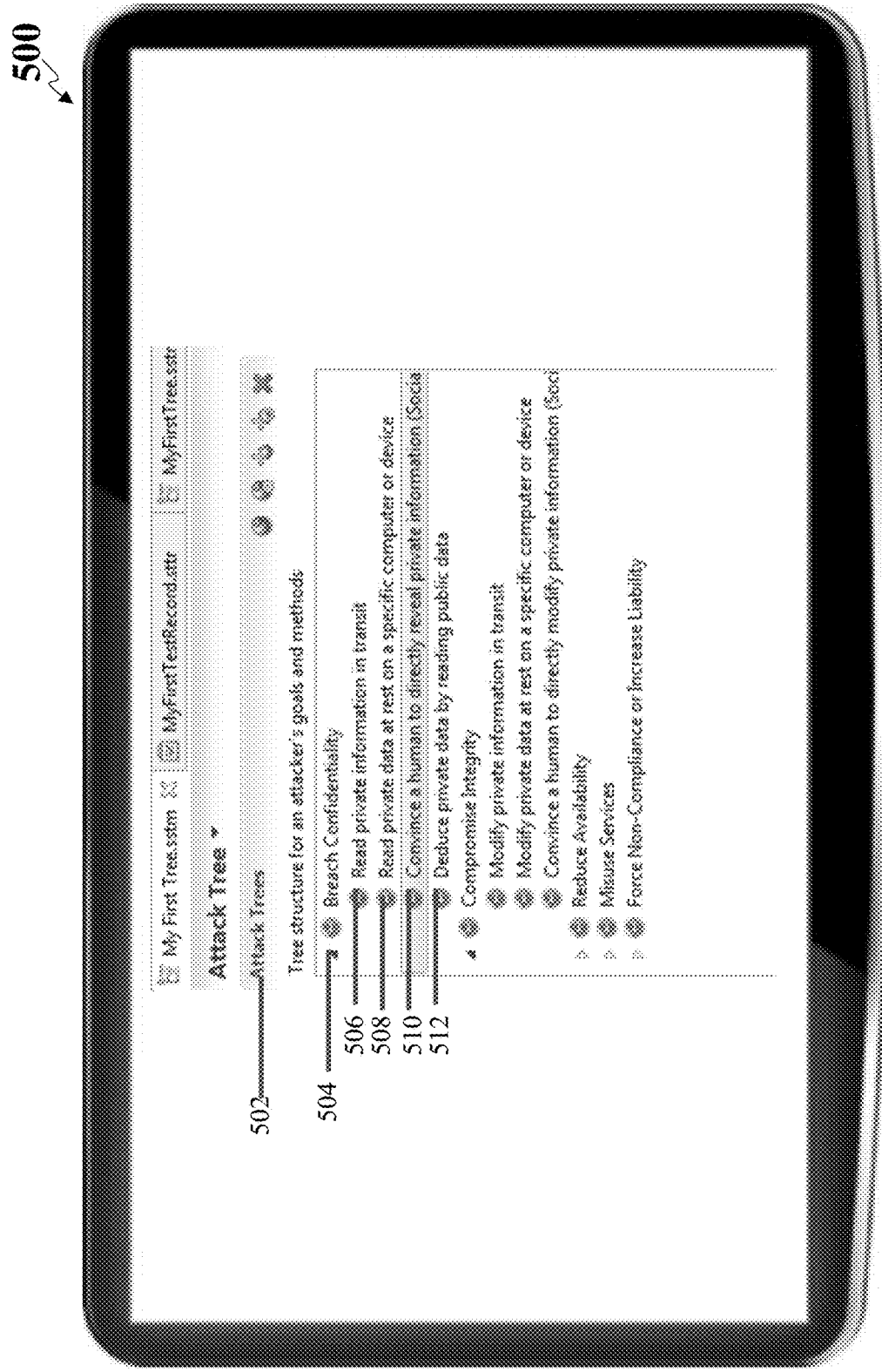
FIG. 5 illustrates an example of a graphical user interface for an attack tree referring to sub attack trees, according to an embodiment.

FIG. 5 illustrates an example of a graphical user interface 500 for an attack tree referring to sub attack trees, according to an embodiment. The GUI 500 may help administrative analysts discover vulnerabilities and misconfigurations in cyber-physical systems. The analytic server may support distributed models, where a high-level model may make reference to multiple sub-system models maintained by others. For example, the attack tree of the unified system may make reference to sub attack trees of the plurality of sub-systems. The analytic server may refer to the sub attack trees as files or via URL. References may add annotation, extra document, or override attributes of referred-to components. References may also make structural modification to the referred-to attack tree models when appropriate via a set of parameters (e.g., to add new attack vectors that are only relevant in a specific context).

As shown in the figure, the attack tree 502 may comprise breach confidentiality, compromise integrity, reduce availability, misuse services, force non-compliance or increase liability, etc. Although the attack trees are in a directory structure, the system may also show a traditional boxes-and-arrows tree diagram, similar to FIG. 3. In the example of breach confidentiality 504, breach confidentiality 504 may comprise read private information in transit 506, read private data at rest on a specific computer or device 508, convince a human to directly reveal private information 510, and deduce private data by reading public data 512.

Figure 6:
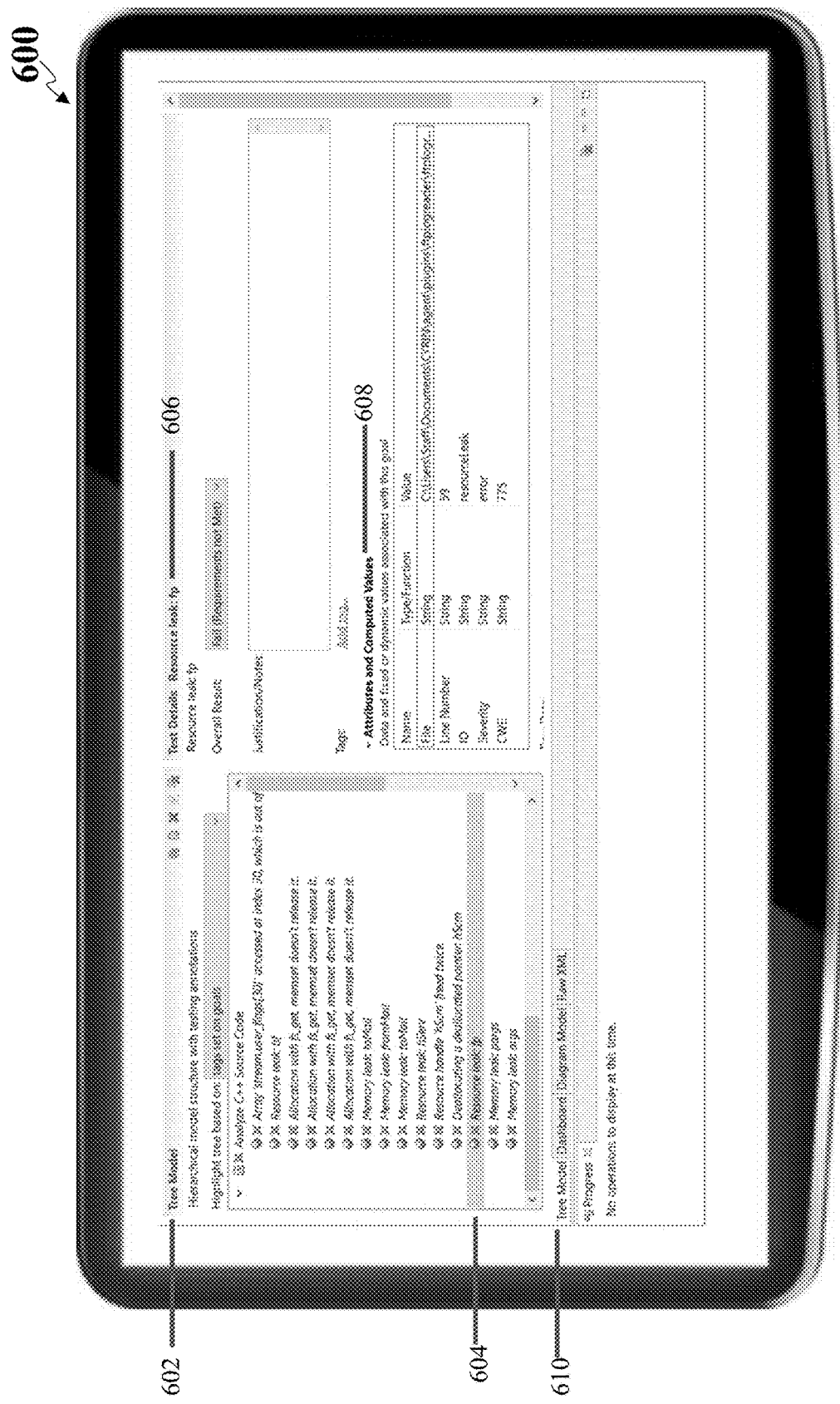
FIG. 6 illustrates an example of a graphical user interface for attack reports of the cyber-physical systems, according to an embodiment

FIG. 6 illustrates an example of a graphical user interface 600 for attack reports of the cyber-physical systems, according to an embodiment. The GUI 600 may comprise hierarchical model structure of the attack tree model 602 with testing annotations. For example, the analytic server may display various attacks in the hierarchical model structure, including resource leak, memory leak, and the like. Upon receiving a selection of a specific attack, the analytic server may display more test details for the selected attack. For example, when attack "resource leak: fp" 604 is selected, the analytic server may display the details 606 for "resource leak: fp," including overall result and justification/notes. Furthermore, the details of the specific attack may also include attributes and computed values 608 associated with the attack. The GUI 600 may also include an interactive component (e.g., a menu) 610 to display additional information about the attacks, such as a dashboard, a diagram model, and raw XML. The GUI 600 is a convenient and intuitive front-end. The analytic server may generate highly customizable attack reports for technical and administrative users based on GUI 600.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   instantiating, by a computer, a first sub attack tree generated at a first cyber-physical system within a distributed network infrastructure, the first sub attack tree being based upon a first physical configuration of the first cyber-physical system;
   instantiating, by the computer, a second sub attack tree generated at a second cyber-physical system within the distributed network infrastructure, the second sub attack tree being based upon a second physical configuration of the second cyber-physical system wherein the second physical configuration is distinct from the first physical configuration;
   generating, by the computer, a machine-readable markup file of an attack tree of the distributed network infrastructure, the attack tree containing the first sub attack tree and the second sub attack tree, and the machine-readable markup file containing a first identifier of the first sub attack tree and a second identifier of the second sub attack tree;
   receiving, by the computer in real-time, electronic notifications of alerts from a plurality of devices in the first and second cyber-physical systems; and
   detecting, by the computer, one or more attacks on the distributed network infrastructure based upon the alerts by executing a logic of the attack tree, wherein executing the logic of the attack tree comprises traversing the first sub attack tree based on the first identifier, the second sub attack tree based on the second identifier, and a parent node hierarchically above the first and second sub attack trees to determine an impact on the distributed network infrastructure based upon the alerts.

2. The computer-implemented method according to claim 1, wherein the machine readable markup file is an Extensible Markup Language file.

3. The computer-implemented method according to claim 1, wherein the identifiers are Uniform Resource Locators.

4. The computer-implemented method according to claim 1, wherein the identifiers are Uniform Resource Identifiers.

5. The computer-implemented method according to claim 1, further comprising:
   calculating, by the computer, an impact score for each of the one or more attacks by correlating the physical configurations of the first and second cyber-physical systems.

6. The computer-implemented method according to claim 5, further comprising:
   ranking and prioritizing, by the computer, the one or more attacks based on the corresponding impact scores.

7. The computer-implemented method according to claim 1, further comprising:
   generating, by the computer in real-time, a report in a dashboard comprising a prioritized list of the one or more attacks.

8. The computer-implemented method according to claim 1, further comprising:
   generating, by the computer, a report comprising recommendation actions for mitigating the one or more attacks.

9. The computer-implemented method according to claim 1, further comprising:
   determining, by the computer, impacts of an interconnection of the first and second cyber-physical systems on the distributed network infrastructure based on a set of aggregation rules.

10. The computer-implemented method according to claim 1, wherein the attack tree is in a hierarchical structure comprising a root node and one or more child nodes, the root node representing a higher-level operating condition of an attack, and each of the one or more child nodes representing a lower-level operating condition of the attack.

11. A system comprising:
a non-transitory storage medium storing a plurality of computer program instructions; and
a processor electrically coupled to the non-transitory storage medium and configured to execute the plurality of computer program instructions to:
instantiate a first sub attack tree generated at a first cyber-physical system within a distributed network infrastructure, the first sub attack tree being based upon a first physical configuration of the first cyber-physical system;
instantiate a second sub attack tree generated at a second cyber-physical system within the distributed network infrastructure, the second sub attack tree being based upon a second physical configuration of the second cyber-physical system wherein the second physical configuration is distinct from the first physical configuration;
generate a machine-readable markup file of an attack tree of the distributed network infrastructure, the attack tree containing the first sub attack tree and the second sub attack tree, and the machine-readable markup file containing a first identifier of the first sub attack tree and a second identifier of the second sub attack tree;
receive electronic notifications of alerts from a plurality of devices in the first and second cyber-physical systems; and
detect one or more attacks on the distributed network infrastructure based upon the alerts by executing a logic of the attack tree, wherein executing the logic of the attack tree comprises traversing the first sub attack tree based on the first identifier, the second sub attack tree based on the second identifier, and a parent node hierarchically above the first and second sub attack trees to determine an impact on the distributed network infrastructure based upon the alerts.

12. The system according to claim 11, wherein the machine readable markup file is an Extensible Markup Language file.

13. The system according to claim 11, wherein the identifiers are Uniform Resource Locators.

14. The system according to claim 11, wherein the identifiers are Uniform Resource Identifiers.

15. The system according to claim 11, wherein the processor is configured to further execute the computer program instructions to:
calculate an impact score for each of the one or more attacks by correlating the physical configurations of the first and second cyber-physical systems.

16. The system according to claim 15, wherein the processor is configured to further execute the computer program instructions to:
rank and prioritize the one or more attacks based on the corresponding impact scores.

17. The system according to claim 11, wherein the processor is configured to further execute the computer program instructions to:
generate, in real-time, a report in a dashboard comprising a prioritized list of the one or more attacks.

18. The system according to claim 11, wherein the processor is configured to further execute the computer program instructions to:
generate a report comprising recommendation actions for mitigating the one or more attacks.

19. The system according to claim 11, wherein the processor is configured to further execute the computer program instructions to:
determine impacts of an interconnection of the first and second cyber-physical systems on the distributed network infrastructure based on a set of aggregation rules.

20. The system according to claim 11, wherein the attack tree is in a hierarchical structure comprising a root node and one or more child nodes, the root node representing a higher-level operating condition of an attack, and each of the one or more child nodes representing a lower-level operating condition of the attack.

* * * * *